United States Patent [19]

Sakurai

[11] Patent Number: 5,748,850
[45] Date of Patent: May 5, 1998

[54] KNOWLEDGE BASE SYSTEM AND RECOGNITION SYSTEM

[75] Inventor: Akito Sakurai, Tsurugashima, Japan

[73] Assignee: Hitachi, Ltd., Tokyo, Japan

[21] Appl. No.: 464,208

[22] Filed: Jun. 5, 1995

[30] Foreign Application Priority Data

Jun. 8, 1994 [JP] Japan ................... 6-125963

[51] Int. Cl.⁶ .................................. G06F 15/18
[52] U.S. Cl. ................. 395/50; 395/54; 704/246
[58] Field of Search .................... 395/600, 2.41, 395/200.1, 50, 54; 364/2; 382/100, 186, 226, 181; 704/246

[56] References Cited

U.S. PATENT DOCUMENTS

| | | | |
|---|---|---|---|
| 5,265,065 | 11/1993 | Turtle | 395/600 |
| 5,473,705 | 12/1995 | Abe et al. | 382/100 |
| 5,515,455 | 5/1996 | Govindaraju et al. | 382/186 |
| 5,528,728 | 6/1996 | Matsuura et al. | 395/2.41 |

OTHER PUBLICATIONS

Bhatnagar et al., "Structural and Probabilistic Knowledge for Abductive Reasoning," IEEE Trans. on Pattern Analasys & Machine Intelligence, vol. 15, Issue 3, pp. 233–245, Mar. 31, 1993.

"Probabilistic Reasoning in Intelligent Systems" written by Judea Pearl and published from Morgan Kaufmann Publishers in 1988.

"Bayesian Networks" written by David Heckerman et al in pp. 27 to 30 of the Communications of the ACM, Mar. 1995, vol. 38, No. 3.

"Gurafu Riron (Graph Theory)" written by Berge and published from Kindai Kagaku Sha.

*Primary Examiner*—Tariq R. Hafiz
*Attorney, Agent, or Firm*—Antonelli, Terry, Stout & Kraus, LLP

[57] ABSTRACT

In a recognition system using a knowledge base in which there is required tolerance for ambiguity and noises in a knowledge expressing system not having the cause-and-effect relation existing, for example, in a knowledge base system employed for pattern recognition. The knowledge base supported recognition system includes as an inference engine an apparatus in which a hypergraph is added to the data structure of the knowledge base to obtain a minimum cost tree or the like by use of costs assigned to hyperedges of the hypergraph. With this provision, there can be attained tolerance for ambiguity of the knowledge base and noises superimposed on input data.

10 Claims, 9 Drawing Sheets

TABLE OF EDGES (E) /130

| EDGE NO. | COST | NO. OF NODES | NODE NO. | | | | |
|---|---|---|---|---|---|---|---|
| e1 | 5 | 3 | 1 | 3 | 5 | 0 | ... |
| e2 | 10 | 2 | 5 | 6 | 0 | 0 | ... |
| ... | ... | ... | ... | ... | ... | ... | ... |
| eL | 8 | 2 | 11 | 15 | 0 | 0 | ... |

TABLE OF EDGES ARRANGED IN ASCENDING COST ORDER (SE) /135

| | EDGE NO. | COST |
|---|---|---|
| 1 | 53 | 1 |
| 2 | 70 | 3 |
| ... | ... | ... |
| L | 20 | 950 |

KNOWLEDGE BASE SYSTEM AND RECOGNITION SYSTEM

BACKGROUND OF THE INVENTION

The present invention relates to a recognition system employing an inference method in a knowledge base system and, in particular to, a knowledge base system, a pattern recognition system, a sign language recognition system, and an optical character recognition system utilizing an inference method having a high tolerance for noises.

Heretofore, to cope with ambiguity and noises on a knowledge base, there have been employed a Bayesian network, an influence diagram, and the like. Details about these methods have been described, for example, in the "Probabilistic Reasoning in Intelligent Systems" written by Judea Pearl and published from Morgan Kaufmann Publishers in 1988. Although not the prior art of the present invention, these methods have been described in an article "Bayesian Networks" written by David Heckerman et al in pages 27 to 30 of the "Communications of the ACM", March 1995, Vol. 38, No. 3. In these methods, an oriented or directed graph is employed as fundamental expressing means. For example, assume that a cause-and-effect relation "when a thief enters the room, a warning buzzer sounds" exists between two nodes "a thief enters the room" and "a warning buzzer sounds". Assume also that a cause-and-effect relation "when a wrong operation occurs in a buzzer, a warning buzzer sounds" exists between two nodes "a wrong operation occurs in a buzzer" and "a warning buzzer sounds". Under this condition, the relations can be expressed with oriented vectors or arrows between corresponding pairs of nodes. The former and the latter are described with a higher probability (e.g., 0.9) and a lower probability (e.g., 0.01), respectively. According to these methods, the cause-and-effect relations are expressed by directed edges of the directed graph in which strength of each cause-and-effect relation is represented by a conditional probability assigned to the directed edge. For the above example of the thief's, the probability that the warning buzzer sounds is 0.9 under the condition that the thief has entered the room. Using these conditional probabilities, there is achieved an inference or reasoning process in which the probability of each state (either one of two states respectively expressed as 0 and 1 in many cases) of a node is calculated according to the conditional probabilities of the cause-and-effect relations of the edges that end at the node.

On the other hand, these cause-and-effect relations are missing in any problem itself of pattern recognition.

However, in the conventional technology of pattern recognition, there have been used a method in which knowledge related to pattern recognition is expressed in a reversed form of cause-and-effect of rules such as "when there exists features f1, f2, and f3 then infer there exists a pattern c", when the pattern c has features f1, f2, and f3 without exceptions so that an inference process is achieved according to the rule base in a similar way but in a opposite direction as cause-and-effect inferences and a method in which the knowledge is equivalently described directly by programs (using If and Then statements, or equivalent statements, of the program language used).

In the above, when analyzing a phenomenon or an event (a pattern to be interpreted or a speech to be recognized in this case) to find out a cause (occurrence factor) thereof, the phenomenon (e.g., a voice or a pattern) and an estimated or inferred cause (or an intermediate factor for inference) are described in the If and Then clauses, respectively of a rule. The rule will be called a test rule herebelow.

Describing a problem in the form of inspection-type rules, functions similar to those of the Bayesian network and influence diagram can be implemented by assigning each rule with, for example, a degree of reliability or likelihood of the rule or a conditional probability for an event in which the conclusion part (consequent) becomes true when the presumption part (antecedent) is true. That is, the methods of the knowledge base system that has cause-and-effect relations can also be employed in the pattern recognition system that does not have cause-and-effect relations.

As a result, the rule base can possess tolerance for ambiguity and noises according to the configuration above.

However, the method is attended with two problems. First, when the number of rules becomes greater, various conflicts occur therebetween. This makes it difficult to prepare rules having desired functions. Moreover, after the rules are completely created, maintenance thereof will be difficult. Incidentally, this problem is inherent to the rule base systems.

Second, when a long chain exists between a cause and a phenomenon or an event related thereto, the meaning of reliability or degree of conviction or believability to be assigned to each rule becomes ambiguous and hence it is difficult to assign thereto a value having integrity with respect to the entire system of rules.

The main reason is that since the cause-and-effect relation in a pattern recognition system are artifically introduced and are no inherent in the system, there may be many possible ways of defining if-clauses or then-clauses and introducing intermediate causes of supposed effects.

Suppose, for example, that the task is to recognized human bodies in front of different backgrounds. One of the rules to differentiate human bodies from backgrounds may be "if there are two arms and a face, then infer there is a human". But we could have "if there is a face, then infer there is a human" since face is a very strong reason to believe that there is a human and we could also have "if there are two hands and a face, then infer there is a human" since there is a good chance that a man or woman behind a desk has a face and two hands very clearly in a photograph. Since a hand is a component of an arm, to characterize a relation between them we could have a rule "if there is a hand, infer that there is an arm".

Now rules become so closely related that likelihood or probability to be assigned to the rules have lost their clear intuitive meaning. It is possible of cause to formalize mathematically the probabilistic relations between the rules and to give them mathematically plausible probabilities. But since the intermediate causes are artificial it is very likely that the probabilities thus given to them are easily changed by adding a single rule such as "if there is a hand and a face, infer there is a human". Note that similar problems rarely happen if cause-and-effect relations are real ones, since even if we introduce intermediate causes, if it is natural as a high output of a touch sensor set to sense an intrusion by a thief, we are always easy to decompose rules related to the intermediate causes as for example decomposing "if a warning buzzer sounds, infer that a theif enters a room" to "if a warning buzzer sounds, infer that a touch sensor senses an intrusion" and "if a touch sensor senses an intrusion infer that a thief enters a room".

On the other hand, for example, in the case of voice recognition handling a natural language in general, a correct statement or sentence can be described according to the grammar to generate the language. Consequently, it apparently seems that noises can be coped with in the grammatical system. The grammar is described in the form of, for example, "a sentence includes a subject and a predicate", "a subject includes noun clauses", and "a predicate includes verb clauses or noun and verb clauses". This kind of grammar is called a generative grammar. In the generative grammar, the rules are reversely oriented when compared with those (inspection-type rules) of knowledge in the pattern recognition described above. The rules thus oriented are called generation or generative rules.

When handling a general problem of pattern recognition, it is also possible to express knowledge in the form of generation rules. For example, knowledge need only be described as "the existence of c causes the existence of features f1, f2 and f3", when c includes a portion of feature f1, f2, and f3.

In this case, each rule can be assigned with reliability, a degree of conviction, or conditional probability in the similar manner as for the inspection-type rules. But there exists the same problem of difficulties of choosing appropriate intermediate causes and of assigning proper probabilities.

In addition to the problem of the inspection-type rules, there exists the following problem when generation rules are employed. In case where a speech or pattern is supplied as an input to the system, quite a large number of computation steps are required to directly obtain the degree of likelihood or occurrence probability thereof.

In this case, one quence of applications of generation rules (and degrees of reliability respectively assigned thereto) assigns only a degree of likelihood or occurrence probability to a particular speech or pattern. In consequence, to attain the degree of likelihood or occurrence probability of a given speech or pattern, it is necessary to determine all combinations of sequences of rules that generate the speech or pattern.

If there is ambiguity in the speech or pattern to be processed further more amount of computation is required.

For example, assume that when some words are pronounced, it is required to estimate the degree of the likelihood or occurrence probability of the issued sentence according to a group of generation rules. For this purpose, conceptually all possible sentences are to be generated. Then we have the occurrence probability for each sentence and we can also obtain ambiguity for each sentence based on the similarity between the sentence and the given words. In consequence, according to the method, there is decided a degree of matching for each candidate sentence so as to finally select a candidate sentence having the least ambiguity and the highest occurrence probability.

The generation rules are attended with a problem similar to that of the inspection-type rules as follows. Although the generation rules are more easily prepared, it is difficult to assign reliability or a degree of conviction to each rule in some cases, particularly, when the inference chain is elongated.

SUMMARY OF THE INVENTION

It is therefore an object of the present invention to provide a knowledge base system and a recognition system having high tolerance for ambiguity and noises in a knowledge expressing system in which the cause-and-effect relation is missing as in a knowledge base system employed in pattern recognition, thereby solving the problems above.

Another object of the present invention is to provide a knowledge base system and a recognition system applicable to a pattern recognition system, a sign language recognition system, a voice recognition system, and an optical character recognition system for which high tolerance for ambiguity and noises is required.

To achieve the objects above, according to an aspect of the present invention, there is provided an inference system using a knowledge base in a knowledge base system storing therein knowledge. The inference system includes inference means or engine (denoted, e.g., by a reference numeral 125 in FIG. 1) for expressing knowledge by a directed or non-directed hypergraph, assigning a cost including an integer, a real value, or a vector value to each hyperedge of the hypergraph, and obtaining a tree of a minimum cost covering a given set of nodes or a tree of a cost providing extremal values of a function covering the given set of nodes. For the decision of the tree of the minimum cost, there is attained a partial hypergraph of the minimum cost from partial hypergraphs for which logical expressions or predicates having nodes and edges of the hypergraph as variables thereof are true (e.g., in step 420 of FIG. 5 or step 320 of FIG. 3) or a partial hypergraph having the cost providing extremal values of the function. Moreover, a pattern recognition system for recognizing a pattern having a feature according to another aspect of the present invention includes recognizing means or engine (denoted by a reference numeral 125) for utilizing a directed or non-directed hypergraph in which a feature or a set of features is assigned as a node and a set of nodes is assigned as a hyperedge, assigning an integer, a real value, or a vector value (to be referred to as a cost herebelow) to each hyperedge of the hypergraph, and obtaining as a result of recognition an interpretation reduced from a tree of a minimum cost covering a given set of nodes or a tree having a cost providing extremal values of a function covering the given set of nodes. For the determination of the tree of the minimum cost, there is attained as the recognition result an interpretation reduced from a partial hypergraph of the minimum cost from partial hypergraphs for which logical expressions or predicates having nodes and edges of the hypergraph as variable thereof are true or a partial hypergraph having the cost providing an extremal value of the function. According to still another object of the present invention, it is also possible to apply the present invention to recognition of an object of recognition in a sign language system, a voice recognition system, and an optical character recognition system.

According to the present invention, a hypergraph is added to the data structure in the knowledge base and an inference engine is means for attaining the minimum cost tree or the like according to cost assigned to each hyperedge of the hypergraph. Namely, the inference engine employs procedures to obtain the minimum cost tree in which between constituent elements of the knowledge base, there is introduced a cost representing a degree of coherency or dependency therebetween. Thanks to this means, there can be provided the tolerance for ambiguity of the knowledge base and noises superimposed on input data. In an example of the cost assignment, the cost is assigned according to a relative frequency of the semantic cooccurrence relation in a corpus. As a method alternative to the method of obtaining the minimum cost tree from the hypergraph, there may be used a method in a case of a small-scale data base in which knowledge is described directly by a program to calculate extremal values of the function so as to obtain the minimum cost tree.

In addition, applying the principle above to a pattern recognition system, a sign language system, a voice recognition system, and an optical character recognition system, the tolerance for ambiguity of the respective systems and noises superimposed on input data can be provided for these systems.

BRIEF DESCRIPTION OF THE DRAWINGS

These and other objects and advantages of the present invention will become apparent by reference to the following description and accompanying drawings wherein.

DESCRIPTION OF THE PREFERRED EMBODIMENTS

Next, referring to the drawings, description will be given in detail of the principle and embodiments according to the present invention.

For easy understanding of the principle of the present invention, an undirected hypergraph will be first defined. Details about the hypergraph has been described, for example, in the "Gurafu Riron (Graph Theory)" written by Berge and published from Kindai Kagaku Sha (1976), which is a translation of "Graphes et hypergraphes" written by C. Berge and published from Dunod, 1970.

Figure 9:
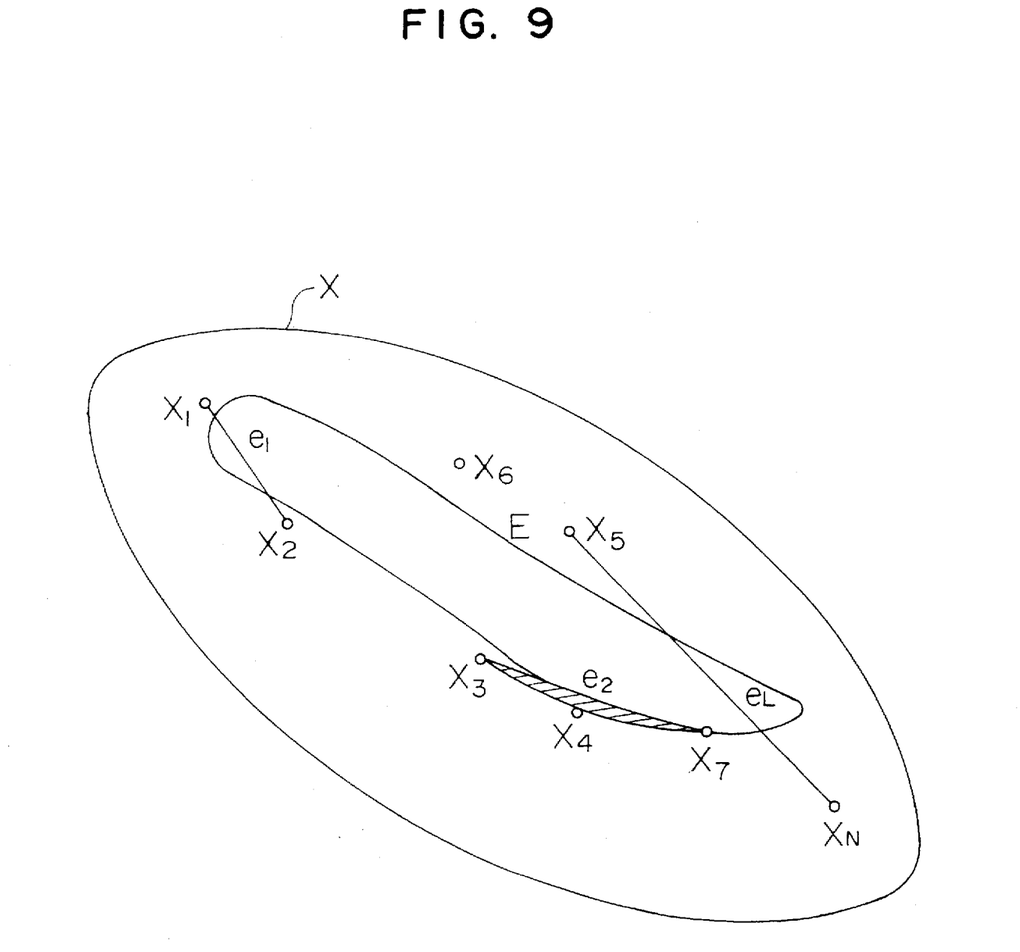
FIG. 9 is a diagram for explaining a finite set and a finite subset according to the present invention.

Assume now a finite set is represented by Expression (1) and a finite set of a finite subset of X in Expression (1) is represented by Expression (2). A finite set is a set including a finite number of elements and a finite subset is a set including some finite number of elements of a set. That is, for example, $e_1$ and $e_2$ of a finite set denoted as E are respectively a finite subset represented by $x_1$ and $x_2$ of the finite set X and a finite subset represented by $x_3$ and $x_4$, and $x_7$ of the finite set X as shown in FIG. 9.

$$X = \{x_1, x_2, \ldots, x_N\} \quad (1)$$

$$E = \{e_1, e_2, \ldots, e_L\} \quad (2)$$

Assume that E of Expression (2) satisfies a condition represented by Expression (3), a pair of X and E expressed in the form of $H=(X,E)$ is defined as an undirected hypergraph. That is, $H=(X,E)$ in the following represents an undirected hypergraph.

$$\bigcup_{i=1}^{k} e_i = X \quad (3)$$

$$e_i \neq \{\} \ (1 \leq i \leq L)$$

where U denotes a union or sum of sets.

Expression (3), requires that the union of elements at $e_i$ is equal to X, and element ei includes at least one element that is, is not empty (See, for example, E and X in FIG. 9).

Herebelow, a hypergraph stands for an un-directed hypergraph unless otherwise specified. An element of X is called a node or vertex of the hypergraph, whereas an element (a subset of X) of E is called a hyperedge or a branch of the hypergraph. A cost of a hyper edge e is expressed as c(e). When a set T of hyperedges satisfies a condition represented by Expression (4), the set T is called a tree. In this situation, it is defined that the tree T covers a set Y of nodes.

① $T = \{t_1, t_2, \ldots t_k\} \subset E$ \quad (4)

② $\bigcup_{i=1}^{k} t_i = Y$

③ $t_i \neq \{\} \ (1 \leq i \leq K)$

④ $|t_i \cap t_j| \leq 1 \ (i \neq j)$,

⑤ for any $t_{i1}, t_{i2}, \ldots, t_{iM}$.

(where $|t_{ij} \cap t_{ij}Q_j| = 1, M \geq 3$)

$|t_{i1} \cap t_{iM}| = 0$

Moreover, the cost of the tree T is expressed by expression (5) as follows.

$$\sum_{i=1}^{K} c(t_i) \quad (5)$$

That is, ① of Expression (4) designates that T is a finite set including elements $t_1, t_2, \ldots, t_k$; furthermore, T is a subset of the finite set E (relation of inclusion).

In addition, ② and ③ of Expression (4) indicate that Y is a sum of sets $t_i$, namely, the union of the elements $t_i$ and $t_j$ includes at least one element that is, is not empty. Moreover, ④ of Expression (4) denotes that a product set, or common subset, between $t_i$ and $t_j$ includes at most one element, whereas ⑤ thereof represents that the number of elements in a product set of successive $t_i$ is one and the number of elements in a product set $t_i$ at both ends is zero for any $t_{i1}$ to $t_{iM}$ (M is three or more).

Assume that a node of a hypergraph represents a fact in a one-fact-per-node manner, a hyperedge represents existence of coherency or dependency facts covered by it, and the cost thereof indicates degree of the coherency or dependency of facts covered by the hyperedge. When the degree of cooccurrence is higher, namely, when the facts co-occur more easily, the cost of the associated hyperedge becomes lower. In consequence, among the trees covering a set of nodes X, a tree having the minimum cost represents an optimal one of the tree structures each constructed by collecting elements of the node set X according to easiness of cooccurrence, or to a degree of meaningfulness, of the elements and recursively structuring the collection into a tree as in FIG. 7.

Figure 7:
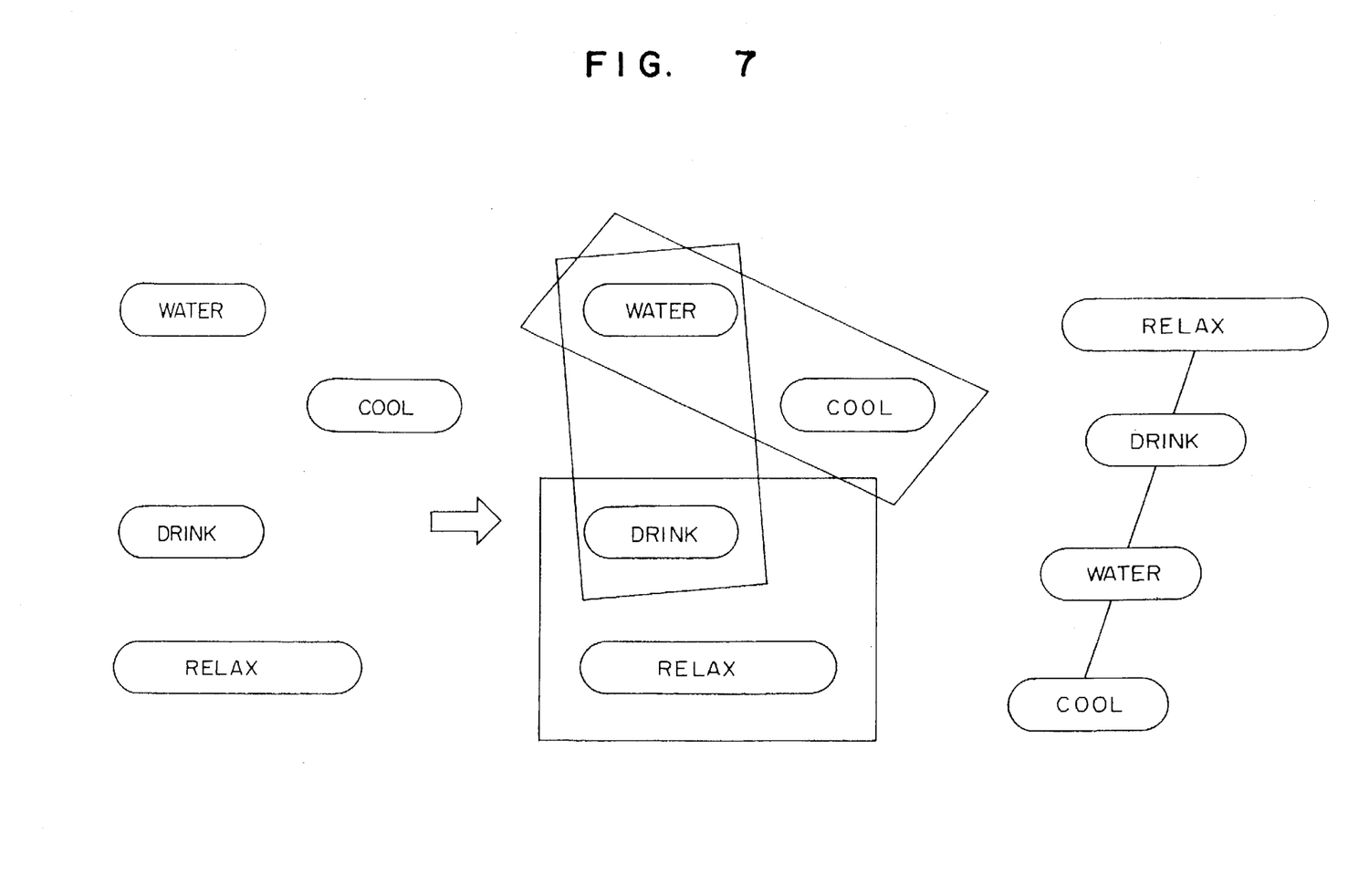
FIG. 7 is a diagram for explaining an embodiment of an algorithm according to the present invention.

FIG. 7 shows an example in which X denotes a set of words and a hyperedge indicates semantic cooccurrence of words, or has well the words, when combined, are meaningful.

In this case, the tree of the minimum cost represents a sentence which has the highest frequency of occurrence or the highest understandability. Namely, in FIG. 7 showing finite sets of not mutually-exclusive node sets such as "drink water", "water is cool", and "when I drink (water), it relaxes me", when these finite sets are appropriately arranged, there is obtained a sequence of sets which correspond to a sentence "when I drink cool water, it relaxes me".

When the direction of dependence relations as well as the dependence relations between nodes are wanted to be expressed there is employed a directed hypergraph, which is defined by Expression (6) as follows.

$$X = \{x_1, x_2, \ldots, x_N\} \quad (6)$$

Assume that X of Expression (6) is a finite set and expression (7) is a finite set of a finite subset of X.

$$E = \{e_1, e_2, \ldots, e_L\} \quad (7)$$

When there exists a function F from E to a subset of X and the finite set E and F satisfy a condition represented by Expression (8), H=(X, E, F) represents a directed hypergraph.

$$\begin{aligned}
&① \bigcup_{i=1}^{L} e_i = X \quad (8) \\
&② e_i \neq \{\} \quad (1 \leq i \leq L) \\
&③ F(e_i) \neq \{\} \quad (1 \leq i \leq L) \\
&④ F(e_i) \quad e_i = \{\} \quad (1 \leq i \leq L)
\end{aligned}$$

Namely, ① and ② of Expression (8) designate that X equals to the union of elements of $e_i$ and the $t_i$ includes at least one element, that is, is not empty.

Moreover, ③ of Expression (8) denotes that $F(e_i)$ is not empty and ④ thereof indicates that $F(e_i)$ is a subset of the finite set ei (relation of inclusion).

Assume that $F(e_i)$ represents an end point or end points of a hyperedge e.

In consequence, $e_{i-F(ei)}$ designates a starting point or starting points of the edge (this may be an empty set in some cases).

An element of X is called a vertex of a directed hypergraph thereof and an element (subset of X) of E is called a branch or a hyperedge or simply an edge of the directed hypergraph. The cost of the edge e is represented as c(_). In this connection, when a set T of edges satisfies a condition of Expression (9), the set T is called a tree.

$$\begin{aligned}
&① T = \{t_1, t_2, \ldots, t_k\} \subset E \quad (9) \\
&② \bigcup_{i=1}^{k} t_i = Y \\
&③ t_i \neq \{\} \quad (1 \leq i \leq K) \\
&④ |t_i \cap t_j| \leq 1 \quad (i \neq j),
\end{aligned}$$

For any $t_{i1}, t_{i2}, \ldots, t_{iM}$.

(where, $F(t_{ij}) \subset t_{ij}Q_j |=1, M \geq 3$)

$|t_{i1} \cap t_{iM}| = 0$

That is, ① of Expression (9) indicates that T is a finite set including $t_1, t_2, \ldots, t_k$ and the finite set T is a subset of the finite set E (relation of inclusion).

In addition, ② and ③ Expression (9) indicate that Y is equal to the union of $t_i$, namely, all elements of $t_i$, when combined, form a set equal to T, and $t_i$ includes at least one element, that is, is not empty. Furthermore, ④ of Expression (9) denotes that a product set, or a common subset, between $t_i$ and $t_j$ includes at most one element, whereas ⑤ thereof represents that a termination point $F(t_{ij})$ of an edge is included in a subsequent element $t_{ij}+1$ for any $t_i$1 to $t_{iM}$, where M is three or more. The number of elements of a product set between the elements $t_i$ at both ends is zero.

In this situation, the tree T is assumed to cover the node set Y and the cost of tree is defined in the same manner as for the undirected hypergraph.

Figure 8:
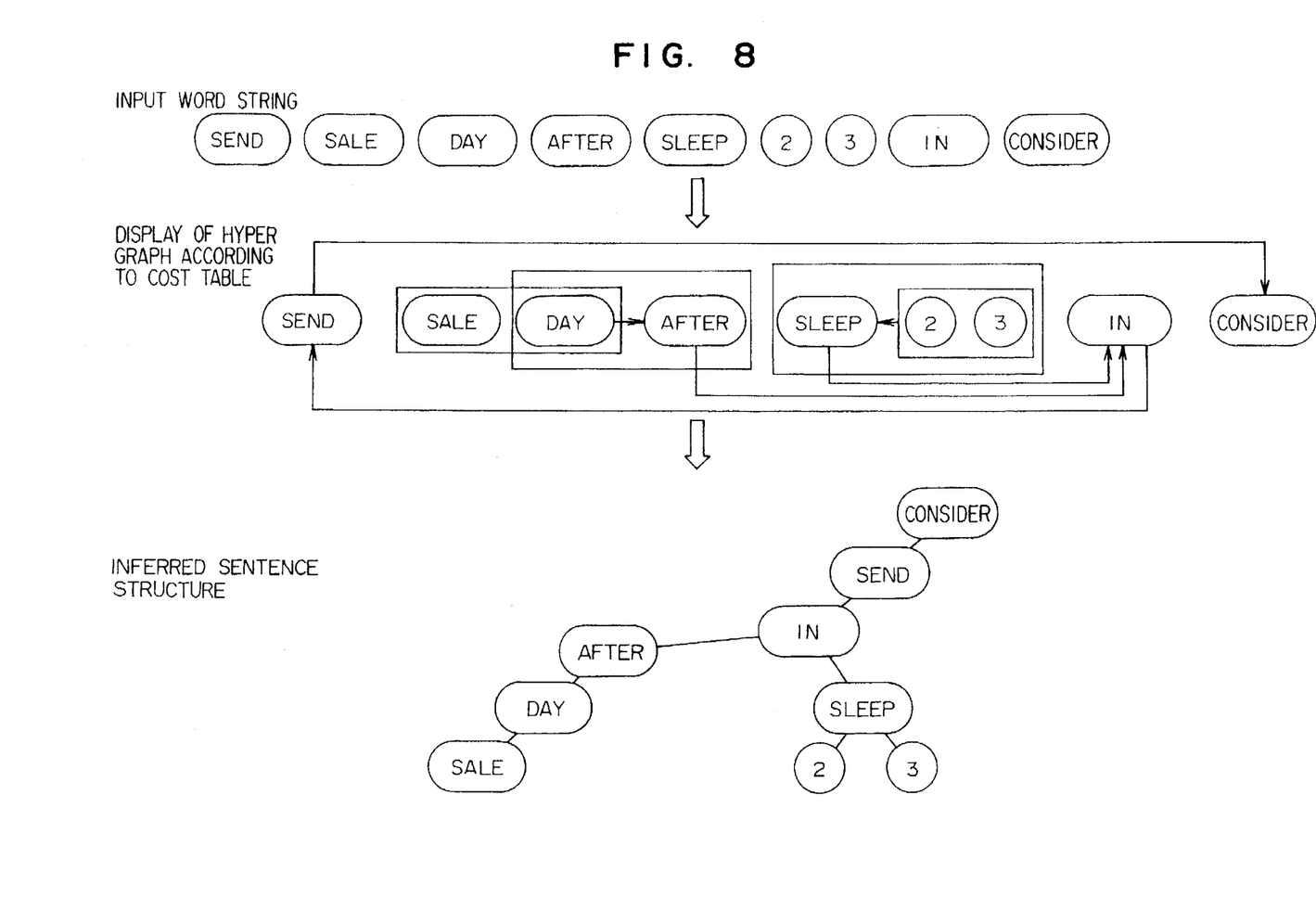
FIG. 8 is a diagram for explaining another embodiment of an algorithm according to the present invention.

FIG. 8 shows an example in which X is a set of words and the edge indicates a semantic cooccurrences of words considering semantic dependency relations.

In this case, the tree having the minimum cost represents a sentence which has the highest frequency of occurrence or the highest understandability.

In short, as indicated by arrows, there are considered finite sets including nine nodes "day of sale", "from the day", "sleeps two or three times", "after the sleep", "in (two or three days)", "sends thereafter", "be considered to be sent". In this situation, the tree of the minimum cost represents a sentence which has the highest frequency of occurrence or the highest understandability. Utilizing a result of the inference, there is obtained a tree "it is considered to be sent when we sleep two or three times after the day of sales". This consequently leads to a result of recognition "is considered to be sent in two or three days after the day of sale".

Figure 1:
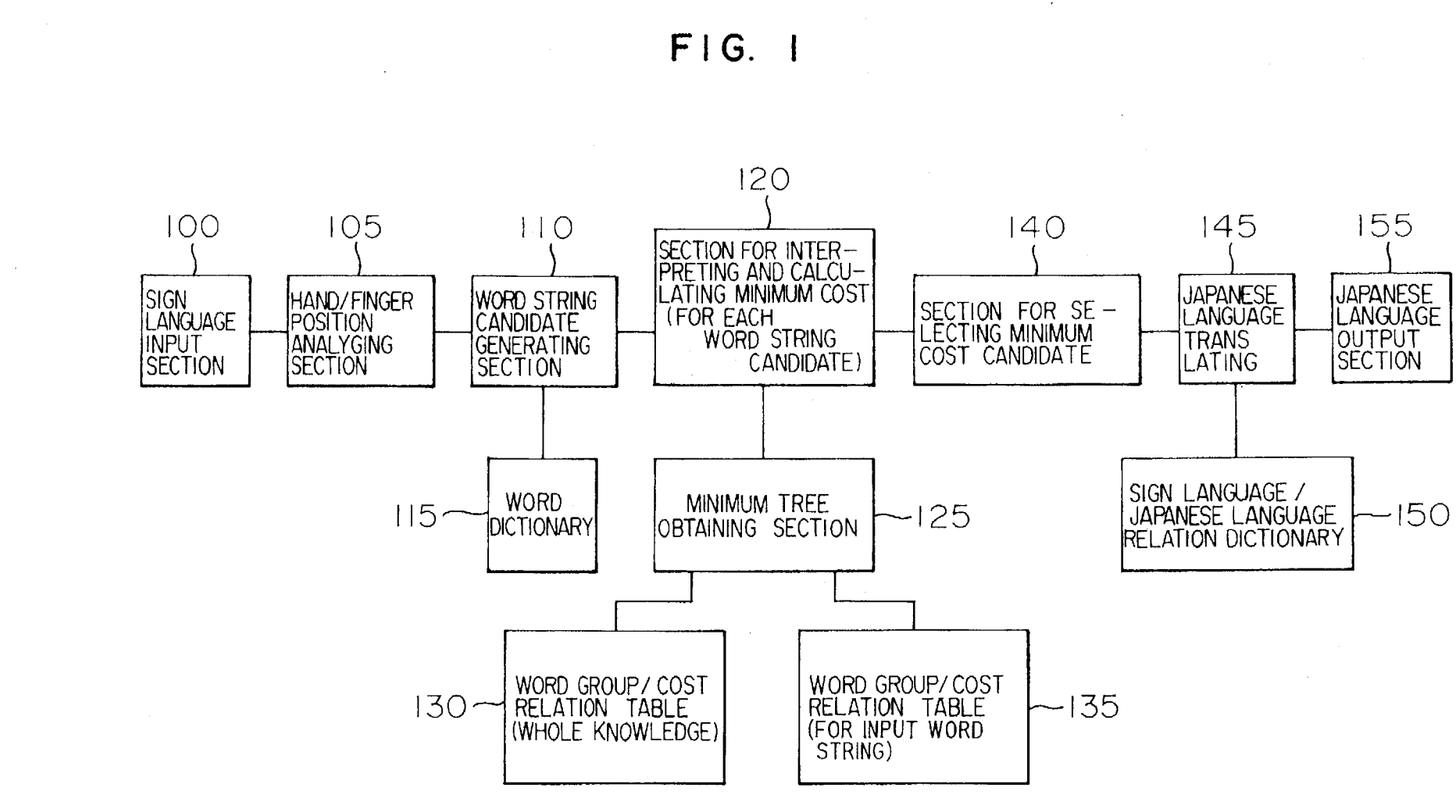
FIG. 1 is a diagram showing the configuration of an embodiment of a sign language/Japanese language translator according to the present invention.
Figure 2A:
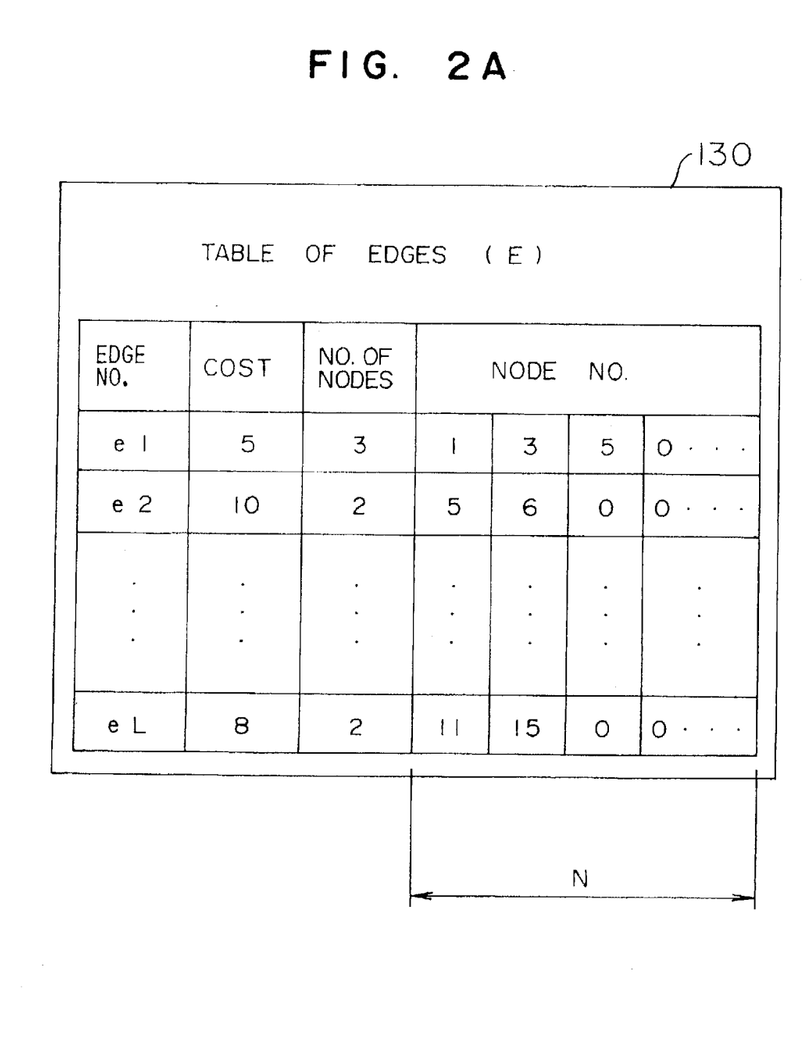
FIGS. 2A and 2B are diagrams showing in detail the construction of a word group/cost relation table of FIG. 1.
Figure 2B:
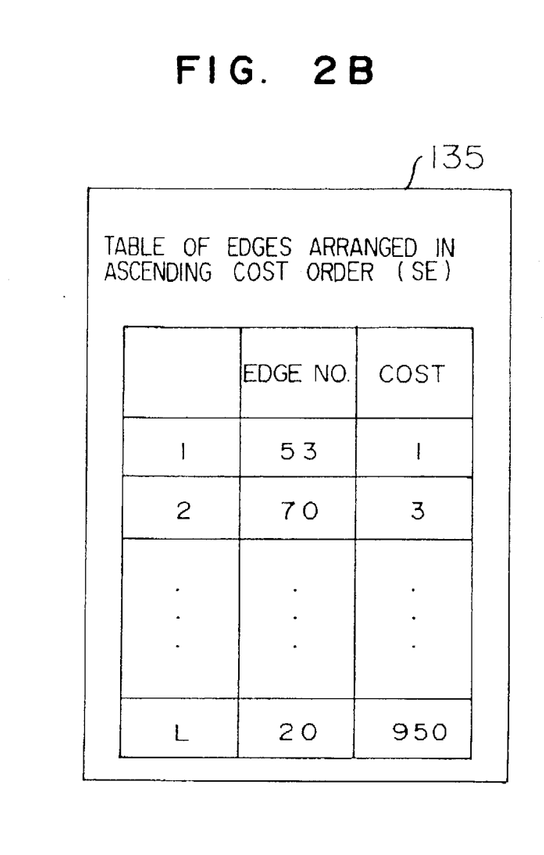
Figure 3:
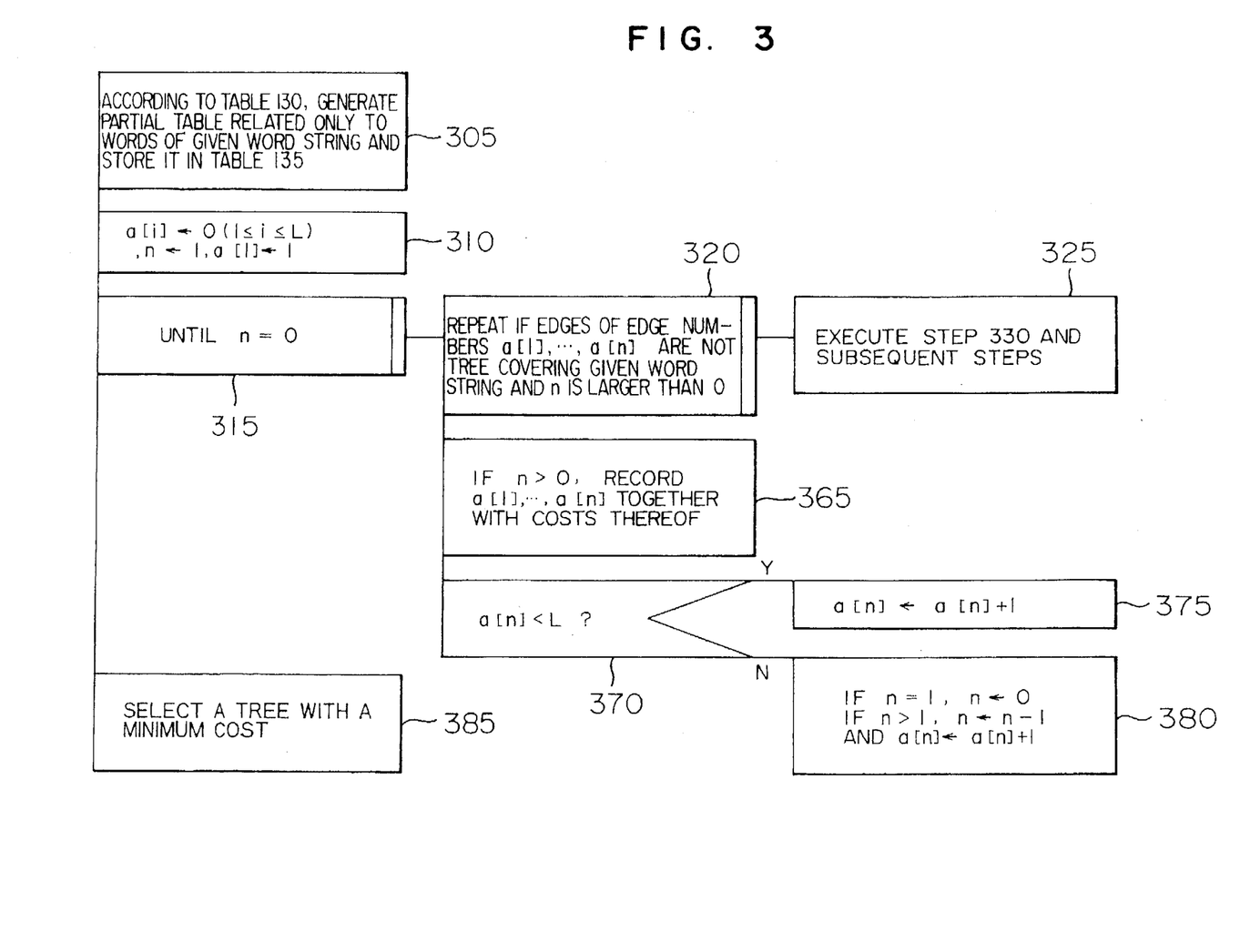
FIG. 3 is a partial flowchart showing the operation procedure of a minimum tree obtaining section of FIG. 1.
Figure 4:
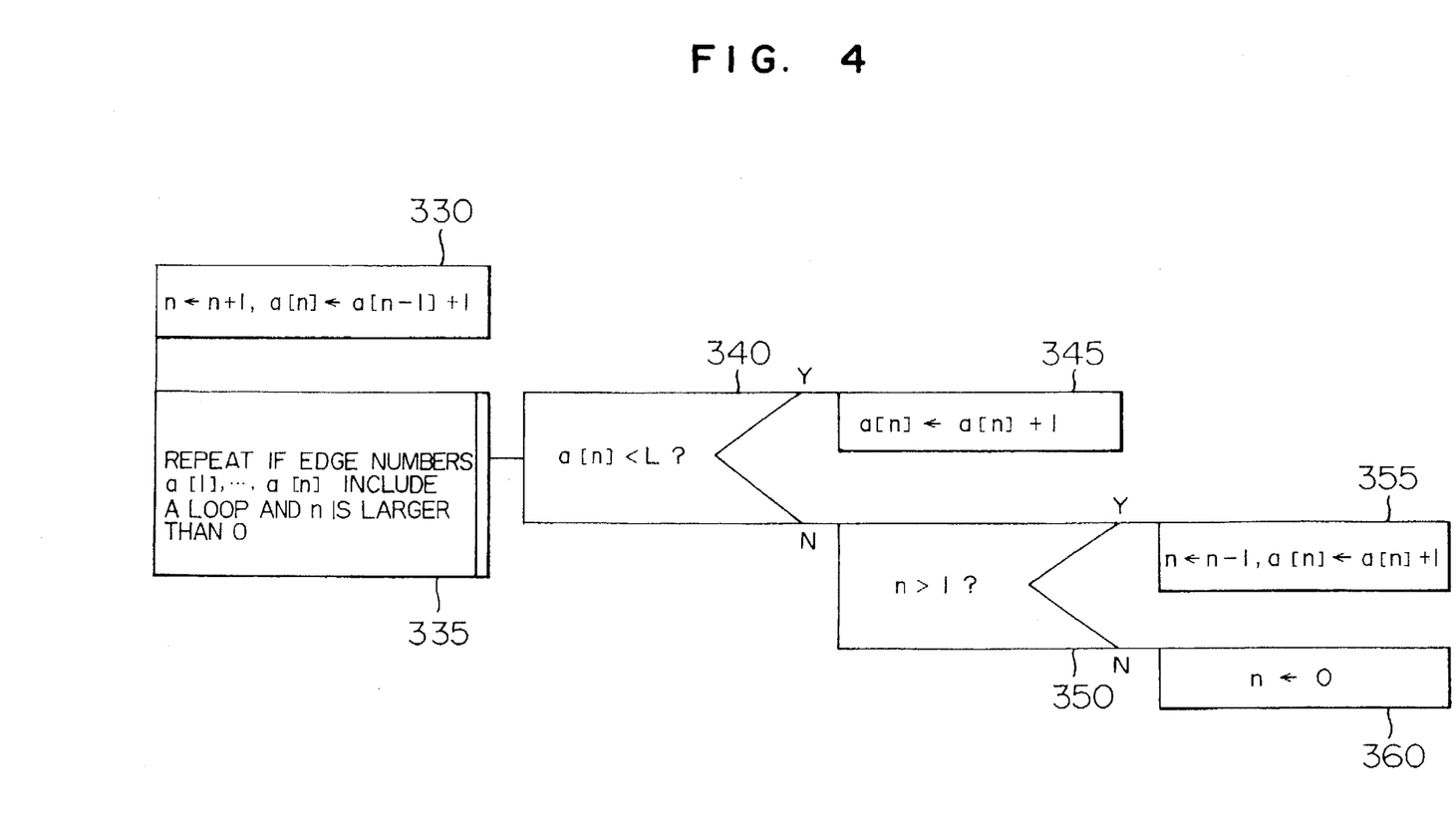
FIG. 4 is also a partial flowchart showing the operation procedure of a minimum tree obtaining section of FIG. 1.

FIG. 1 shows the overall configuration of a sign language translating apparatus as an embodiment according to the present invention and FIGS. 2A and 2B are diagrams for respectively explaining in detail a word group/cost relation table 130 and a word group/cost relation group 135 of FIG. 1. Furthermore, FIGS. 3 and 4 are detailed diagrams for explaining a minimum tree obtaining section (125) of FIG. 1.

The embodiment will be now described with reference to now to FIGS. 1, 2A, 2B, 3, and 4. First, description will be given of the overall constitution of the translating device. The system has a primary function of translating a sign language inherently not having a written language, specifically, the Japanese sign language into the Japanese language. Japanese sign language is characteristic in that the ordering of word sequence base on a grammer is not almost required. In this embodiment, using position sensors or the like (e.g., data gloves) attached on hands and/or fingers, positions of the hands and/or fingers are inputted to the system. The input data is interpreted and translated into sentences of the Japanese language to be presented on a display.

In FIG. 1, a reference numeral 105 indicates a section or device having a function responsive to a sign language input supplied in the form of time series data from a sign language input section 100 to analyze the data so as to acquire therefrom necessary information. A numeral 110 denotes a word string candidate generating device for converting the time series data into a string of words according to a word dictionary 115 beforehand loaded with relations between words and hand/finger positions. In this stage, there are generally attained a plurality of candidates determined to be acceptable on the basis of differences in environmental conditions between when the dictionary 115 is prepared and the current point of time, noises, deviation in actions, personal discrepancy, etc. Means assigned with a reference numeral 120 and subsequent numerals realize a function to solve the ambiguity.

That is, reference numerals 130 and 135 respectively indicate tables of significant word groups and cost representing a degree of coherency or dependency among words in the group. These word group/cost relation tables are beforehand created according to semantic cooccurrence relations between word series obtained from a corpus including a large number of examples of sentences. Assume that when the degree of coeherency of words or the degree of adequency of the dependency relation among words is higher or more acceptable, the cost becomes lower. More concretely, the tables 130 and 135 relate to all knowledge and knowledge of the pertinent word string, respectively. A reference numeral 125 designates a processing section to find, for a word string candidate supplied from a minimum cost interpreting and calculating section 120, hierarchical subdivision thereof into groups of words having the minimum cost or the highest degree of coherency or dependency, namely, the best interpretation of the candidate according to the word group/cost relation tables 130 and 135. A numeral 120 indicates a processing section which for every word string candidate activates the processing unit 125. In a minimum cost candidate selector 140, the values obtained by the processing sections 120 and 125 are compared with each other. Resultantly, an inference process is achieved through the word string candidates to select the best word string candidate. These processing sections 120, 125, and 140 constitute an inference engine. In a Japanese language translating section 145, according to the best interpretation of the best word string candidate obtained as above, there is produced an expression of the Japanese language corresponding thereto with reference to a Japanese sign language/ Japanese language relation table (dictionary) 150 so as to present the Japanese language on an output display section 155.

FIGS. 2A and 2B are diagrams for explaining in detail the word group/cost relation tables 130 and 135, which are also utilized when the minimum tree obtaining section (125 of FIG. 1) is explained in conjunction with FIGS. 3 and 4 and FIGS. 5 and 6. Data is stored in the similar format in the tables 130 and 135 of FIG. 1. The difference between the tables 130 and 135 is as follows. The table 130 is beforehand generated from the corpus as described above so as to store therein a table of costs associated with all word groups of the embodiment, whereas the table 135 contains the costs related only to words of the word string candidate which is to be processed at the point of time by the minimum tree obtaining section (125 of FIG. 1). The table 135 is created from the table 130 when the minimum tree obtaining section 125 is initially activated.

The edge table (E) shown in FIG. 2A includes L horizontal rows and N+2 vertical columns and contains information of connections of the hypergraph used and costs of the respective hyperedges, where L and N indicate the numbers of hyperedges and nodes, respectively. Rows $e_1, e_2, \ldots, e_L$ correspond to the respective hyperedges. Moreover, the first and second columns store therein the cost of each hyperedge and the number of nodes covered by the hyperedge, respectively. The third and subsequent columns store therein the numbers of nodes covered by the respective hyperedges. In this regard, the nodes and hyperedges are assigned with identification numbers 1 to N and 1 to L, respectively.

The table (SE) of FIG. 2B includes L rows and one column in which numbers assigned to hyperedges of the pertinent hypergraph are arranged in the ascending order of costs. For the same cost, the arranging order is undeterminable. In FIG. 2B, the cost column is shown only to indicate that the edge numbers are arranged in the ascending order of costs.

Referring next to FIGS. 3 and 4, description will be given in detail of operation of the minimum tree obtaining section 125 of FIG. 1.

In step 305, according to a large volume of knowledge stored in the word group/cost relation table 130 (for exampe, ordinarily used sign language has 3000 words and about 600 basic words), there is produced a partial table containing only knowledge related to the words included in the given word string candidate so as to store the contents thereof in the word group/cost relation table 135. These tables 130 and 135 are different in size from each other but have an identical configuration. In the following description, although the same symbol (S or SE) is employed, the referenced items are those stored in the relation table 135 shown in FIG. 2B.

In consequence, N and L respectively indicate the numbers of words in the given word string and hyperedges covering either one of the subsets of the set of the words.

Subsequently, initialization is conducted in step 310. An array $a[1], \ldots, a[n]$ represents a tree covering all words of the given word string at termination of step 325. At an intermediate point of step 325, an intermediate result for the tree is memorized (step 365). In step 315, the operation is repeatedly executed with n=0 set as the terminating condition (iteration with the "until" type). The termination with n=0 in steps 320 to 380 indicates that the search operation has been completed for all possible cases.

Next, step 320 repeatedly executes the step 325 and subsequent steps while n>0 and or a partial graph represented by the array $a[1], \ldots, a[n]$ is not a tree which covers the given word string (using the "while" type iteration).

At a point where control is transferred to step 330, the given word string is not yet covered with the edge set represented by the array $a[1], \ldots, a[n]$. Consequently, in step 330, a new hyperedge is first added to the array $a[1], \ldots, a[n]$. In step 335 a check is made for the conditions (Expression (4)) necessary for the array $a[1], \ldots, a[n]$ to represent a tree, namely, the conditions of ④ and ⑤.

If the conditions are satisfied, the iteration beginning at step 340 is skipped to pass control via step 325 to an iteration end check beginning at step 320.

If either one of the conditions ④ and ⑤ of expression(4) is not satisfied (i.e., a loop is detected in the hyperedge set represented by the array $a[1], \ldots, a[n]$), the finally added hyperedge is deleted from the array $a[1], \ldots, a[n]$ and then a new hyperedge is added thereto. The operation is achieved by steps 340 to 360. Namely, this is carried out by adding one as follows. However, for the addition of one, a[n] is required to be less than L (step 340). The new hyperedge to be added has an edge number next to the last edge number in the ascending order. Namely, when a[n] is less than L, it is only necessary to add one to a[n] (step 345). When the finally added hyperedge has an edge number Ⓛ which is the largest value among those of the other hyperedges, the hyperedge is deleted (the number of hyperedges of the array $a[1], \ldots, a[n]$ is hence reduced) and the hyperedge previously added is employed in the process. That is, when a[n] is equal to or larger than L, it is first confirmed that n is larger than one and then one is subtracted from n (step 355). If n=1, it is indicated that the search has already been conducted for all possible cases. Consequently, n is set to zero (n=0) to satisfy the iteration end condition of step 335 (step 360).

In step 365, the obtained tree (array $a[1], \ldots, a[n]$) is memorized together with the costs thereof. In steps 370 to 380, there is executed a process similar to that of steps 330 to 360.

Finally, the trees memorized in step 365 are checked to detect one having the minimum cost in step 385.

In the embodiment associated with FIGS. 3 and 4, all trees are examined according to the tables as described above, which hence takes a long period of execution time.

Figure 5:
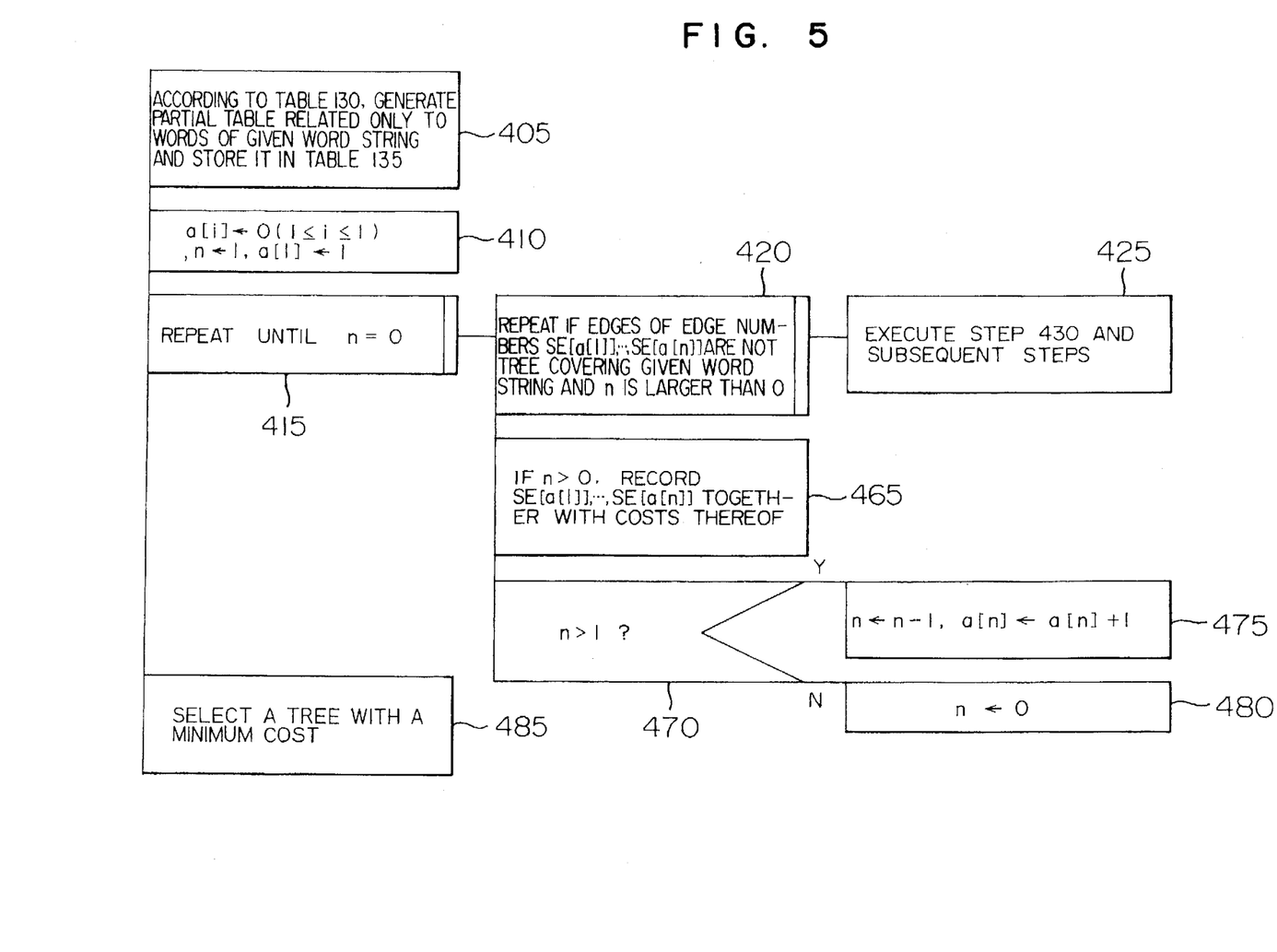
FIG. 5 is a partial flowchart showing operation of a minimum tree obtaining section in which the minimum cost tree can be obtained at a higher speed when compared with the flowcharts of FIGS. 3 and 4.
Figure 6:
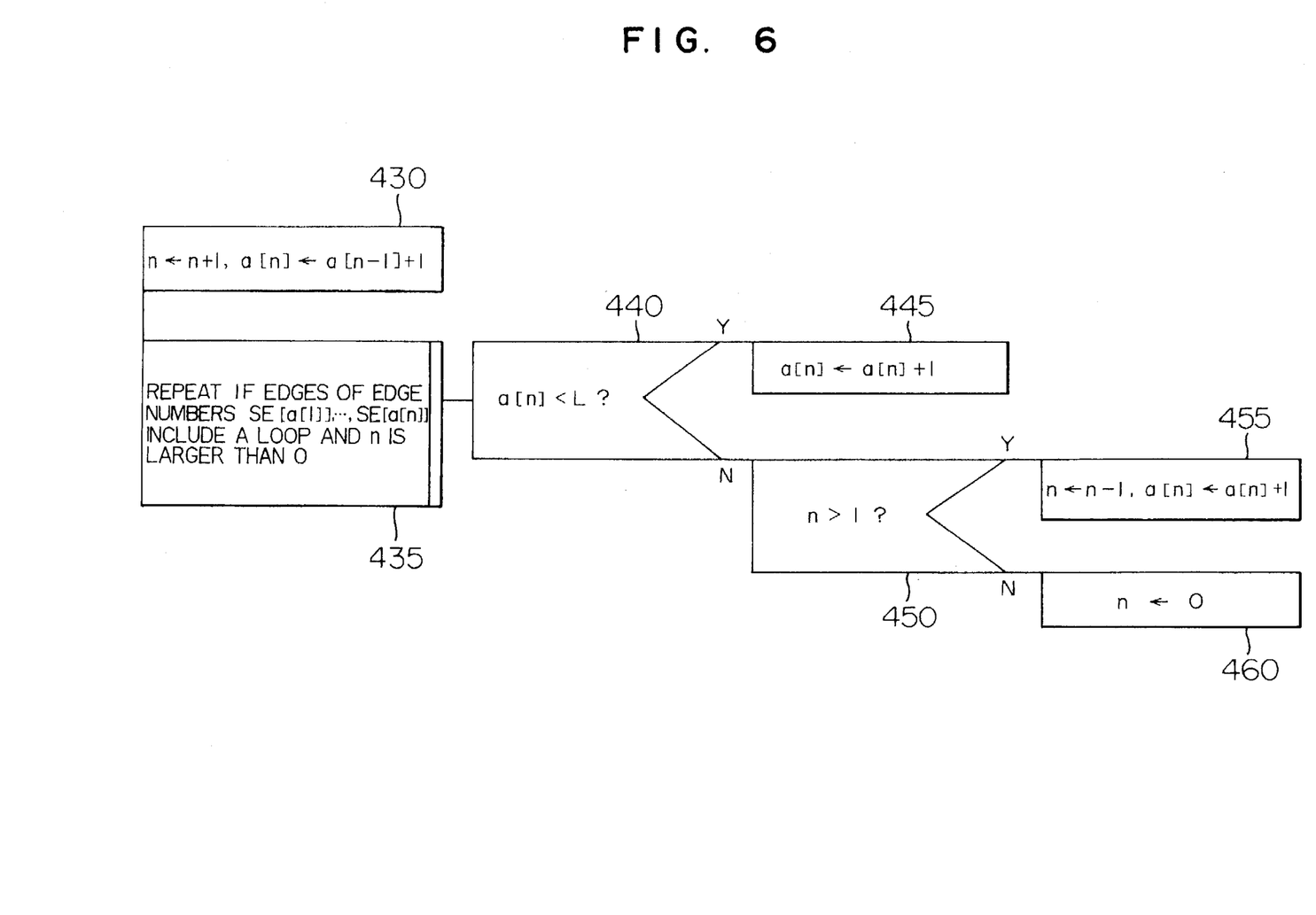
FIG. 6 is a partial flowchart showing operation of a minimum tree obtaining section in which the minimum cost tree can be obtained similarly at a higher speed.

FIGS. 5 and 6 are flowcharts for explaining in detail the minimum tree obtaining section 125 of FIG. 1. In the embodiment of FIGS. 5 and 6, the minimum cost tree can be attained at a higher speed as compared with the embodiment of FIGS. 3 and 4 by using a table SE.

First, initialization is carried out in step 410. At termination of step 425, an array SE[a[1]], ..., SE[[n]] represents a tree covering all words of the given word string. At an intermediate point of calculation in step 425, an intermediate result for the tree is memorized. In step 415, iteration is indicated with a terminating condition of n=0 (the "until" type iteration). Namely, termination with n =0 in steps 420 to 480 represents that the search operation has been completed for all possible cases.

Step 420 repeatedly executes step 425 and subsequent steps while n>0a partial hypergraph represented by the array SE[a[1]], ... ,SE[[n]] is not a tree which covers the given word string (the "while" type iteration).

At a point where control is passed to step 430, the given word string is not yet covered with the edge set represented by the array SE[a[1]], ..., SE[a[n]]. Consequently, in step 430, a new edge is first added to the array SE[a[1]], ..., SE[a[n]]. In step 435, a check is made for the conditions of ④ and ⑤ (Expression (4)) necessary for the array SE[a[1]], ... ,SE[a[n]] to represent a tree. If the conditions are satisfied, the iteration beginning at step 440 is skipped and control is passed via step 425 to an iteration end check beginning at step 420.

If either one of the conditions ④ and ⑤ of expression(4) is not satisfied (i.e., a loop is detected in the hyperedge set represented by the array SE[a[1]], ..., SE[a[n]]), the finally added hyperedge is deleted from the array SE[a[1]], ..., SE[a[n]] and then a new hyperedge is added thereto. The process is achieved by steps 340 to 360. Namely, the new hyperedge to be added has an edge number next to the last edge number in the ascending order (step 445). However, when the finally added hyperedge has an edge number ⓛ which is the largest value among those of the other hyperedges, the hyperedge is deleted (hence the number of hyperedges of the array SE[a[1]], ... ,SE[a[n]] is reduced) and the hyperedge previously added is employed in the process (step 455). If n=1 (step 450), it is indicated that the search has already been conducted for all possible cases and n is consequently set to zero (n=0) to satisfy the iteration end condition of step 435 (step 460).

In step 465, the resultant tree (array SE[a[1]], ... ,SE[a[n]]) is memorized together with the costs thereof. In steps 470 to 480, a subsequent tree candidate is established.

In this situation, since the hyperedge costs are arranged in the ascending cost order in the array SE, it can be understood that the finally added hyperedge need not be replaced with any one subsequent thereto. Consequently, the finally added hyperedge is simply deleted (step 475), thereby employing the second last added hyperedge as the pertinent hyperedge.

Finally, the trees memorized in step 465 are checked to detect one having the minimum cost in step 485.

In this connection, if the strictly minimum cost tree is not needed, step 470 and subsequent steps may be dispensed with. In an embodiment in which these steps are omitted, there exists quite a high possibility of attaining a tree actually having the minimum cost according to characteristics of the table SE. Moreover, in other cases, there can be obtained a tree having quite a small cost.

In case where a voice or sound signal is adopted as the input to the embodiment of FIG. 1, the configuration can be modified to a voice recognition system as follows. Namely, it is only necessary that the hand/finger position analyzer 105 is replaced with a frequency analyzing device, the output from the frequency analyzer 105 is substituted for a phoneme, and the word dictionary 115 is replaced with a table of correspondences between words and spectral, phonemes, or information thereof.

Furthermore, in the embodiment of FIG. 1, when a video signal is used as the input thereto, there can be configured an inference-based character recognition system as follows. That is, it is only required that the hand/finger position analyzer 105 is substituted for an image feature extracting device, the output from the image feature extracting device 105 is replaced with a description of the image feature, the word dictionary 115 is substituted for a table of correspondences between characters to be recognized and features of images thereof, and the word group/cost relation table 130 is replaced with a knowledge base, for example, a known dictionary of occurrences of words and sentences.

Additionally, using a video signal as the input to the embodiment of FIG. 1, there can be configured a pattern recognition system as follows. That is, it is only required that the hand/finger position analyzer 105 is replaced with an image feature extracting device, the output from the image feature extracting device 105 is substituted for a description of the image feature, the word dictionary 115 is substituted for a correspondence table between objects to be recognized and features of images thereof, and the word group/cost relation table 130 is replaced with a knowledge base, e.g., a known dictionary of occurrences of features and objects.

In addition, in the embodiment of FIG. 1, when the hand/finger position analyzer 105, word string candidate generator 110, and word dictionary 115 are removed and an array of a plurality of identifiers of objective concepts are used as the input to the minimum cost interpreting and calculating section 120, there can be constructed a knowledge data base system as follows. Namely, it is only necessary that the Japanese converting section 145 and the sign language/Japanese language dictionary 150 are deleted therefrom and the output from the minimum cost candidate selector 140 is replaced with a graphic representation of a tree contour on the output display device.

According to the present invention as described above, there is provided inference engine including procedures in which a cost representing the degree of meaningfulness is employed between constituent elements of a knowledge base so as to obtain a minimum cost tree or the like. Consequently, there can be attained tolerance for ambiguity of the knowledge base and noises superimposed on input data. Furthermore, there can be implemented, in addition to the knowledge base system, a pattern recognition system, a sign language recognition system, a voice recognition system, and an optical character recognition system which are tolerant of the ambiguity and noises.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

I claim:

1. An inference method for use with a knowledge base storing therein knowledge, comprising the steps of:
   representing input knowledge by either one of an undirected hypergraph or a directed hyperqraph including at least one hyperedge having at least two consequence nodes;

assigning to each hyperedge of said one hypergraph relating to said input knowledge, by reference to a cost relation table, an integer, a real value, or a vector value defined as a cost representing a degree of coherency or dependency between elements of knowledge;

executing an operation of obtaining a tree having a minimum cost covering a set of given nodes as knowledge elements of a word string representing the input knowledge to be processed or a tree having a cost providing extremal values of a function covering said given node set;

based on the result of said operation execution, among sub-hypergraphs of the hypergraphs satisfying logical expressions or predicates in which identifiers of nodes and edges of said one hypergraph are used as variables, determining a sub-hypergraph having a minimum cost or having a cost providing extremal values of the function as the minimum cost tree one, and inferring said determined minimum cost tree one as a tree structure for the input knowledge corresponding thereto from said knowledge base.

2. An inference method according to claim 1, wherein said one hyperqraph is a preset representation of the input knowledge.

3. A pattern recognition system for recognizing a pattern having a feature, comprising:

input means for representing an input pattern feature by either one of an undirected hypergraph or a directed hypergraph including at least one hyperedge having at least two consequence nodes;

recognition means employing said one of a directed or undirected hypergraph in which the input feature or a set of features are adopted as a node and a set of nodes with each of the hyperedges of said one hypergraph being assigned with an integer, a real value, or a vector value defined as a cost, and obtaining as a result of recognition an interpretation attained from a tree having a minimum cost covering a set of given nodes or a tree having a cost providing extremal values of a function covering the given node set; and means, responsive to the interpretation from said recognition means, for determining a minimum cost tree as a tree of the input pattern from the partial hypergraphs of said one hypergraph providing truth for logical expressions or predicates in which identifiers of nodes and edges of said one hypergraph are used as variables and outputting the corresponding pattern from the system.

4. A pattern recognition system according to claim 3, wherein said one hypergraph is preset.

5. (four times amended) A sign language recognition system for recognizing an issued sign language according to an action of hands of a speaker and converting the hand action into words, comprising:

a cost definition table including relations set for groups of related or dependent words and costs representing degrees of coherency or dependency therebetween, the relation being generated in accordance with semantic co-occurrence relations from a corpus;

means for representing input words by either one of a directed or undirected hypergraph in which a word or a set of words is adopted as a node and a set of nodes with each of the hyperedges of said one hypergraph having at least two consequence nodes, and being assigned with an integer, a real value, or a vector value defined as a cost, by reference to said cost definition table; and means for determining a tree having a minimum cost covering a set of given nodes or a tree having a cost providing extremal values of a function covering the given node set from partial hypergraphs of said one hypergraph as a semantic tree for the input handaction or handaction string to be recognized and outputting said handaction or handaction string from the system.

6. A sign language recognition system according to claim 5, wherein said one hypergraph is preset.

7. A voice recognition system for receiving an issued voice of a speech, recognizing the contents thereof, and converting the contents of the speech into words, comprising:

recognition means employing either one of a directed or undirected hypergraph, in which the word, a phoneme thereof, a set of words, or a set of phonemes is defined as a node and a set of nodes is defined as a hyperedge with each of the hyperedges of said one hypergraph having at least two consequence nodes and being assigned with an integer, a real value, or a vector value called a cost, and obtaining as a result of recognition an interpretation attained from a tree having a minimum cost covering a set of given nodes or a tree having a cost providing extremal values of a function covering the given node set, wherein a check is made through partial hypergraphs of said one hypergraph to determine the minimum cost tree, considering only the partial hypergraphs providing truth for logical expressions or predicates in which identifiers of nodes and edges of said one hypergraph are used as variables, one of the trees that are the partial hypergraphs having a minimum cost or having a cost providing extremal values of the function is determined as the minimum cost tree, and an interpretation obtained from the minimum cost tree is set as the result of the recognition means; and an output means for converting the result into words and outputting the words from the system.

8. A voice recognition system according to claim 7, wherein said one hypergraph is preset.

9. An optical character recognition system for optically recognizing a word or a character, comprising:

recognition means employing either one of a directed or undirected hypergraph in which the word, the character, or a constituent element of the word (to be referred to as character element herebelow), a set of words, a set of characters, or a set of character elements is defined as a node and a set of nodes is defined as a hyperedge with each of the hyperedges of said one hypergraph having at least two consequence nodes and being assigned with an integer, a real value, or a vector value called a cost, and obtaining as a result of recognition an interpretation attained from a tree having a minimum cost covering a set of given nodes or a tree having a cost providing extremal values of a function covering the given node set, wherein a check is made through partial hypergraphs of said one hypergraph to determine the minimum cost tree, only the partial hypergraphs providing truth for logical expressions or predicates in which nodes and hyperedges of said one hypergraph are used as variables, one of the trees that are the partial hypergraphs having a minimum cost or having a cost providing extremal values of the function is determined as the minimum cost tree, and an interpretation obtained from the minimum cost tree is set as the result of the recognition means; and an output means for determining the word or character corresponding to the result and outputting said word or character from the system.

10. (New) An optical character recognition system according to claim 9, wherein said one hypergraph is preset.

* * * * *